United States Patent [19]

Scott

[11] Patent Number: 5,710,761

[45] Date of Patent: Jan. 20, 1998

[54] ERROR CONTROL NEGOTIATION BASED ON MODULATION

[75] Inventor: Robert Earl Scott, Indian Rocks Beach, Fla.

[73] Assignee: Paradyne Corporation, Largo, Fla.

[21] Appl. No.: 458,048

[22] Filed: May 31, 1995

[51] Int. Cl.⁶ ...................................................... H04L 1/00
[52] U.S. Cl. ........................ 370/252; 375/222; 379/93.08
[58] Field of Search ................................. 370/252, 465, 370/466, 467, 469; 375/222; 379/93

[56] References Cited

U.S. PATENT DOCUMENTS

| | | | |
|---|---|---|---|
| 4,715,044 | 12/1987 | Gartner | 375/8 |
| 5,384,780 | 1/1995 | Lomp et al. | 375/222 |
| 5,430,793 | 7/1995 | Ueltzen et al. | 375/222 |
| 5,481,696 | 1/1996 | Lomp et al. | 395/500 |
| 5,550,881 | 8/1996 | Sridhar et al. | 375/222 |
| 5,636,037 | 6/1997 | Saitoh | 375/222 |

*Primary Examiner*—Melvin Marcelo
*Attorney, Agent, or Firm*—Thomas, Kayden, Horstemeyer & Risley

[57] ABSTRACT

A modem dynamically selects the type of error-control negotiation sequence as a function of a negotiated parameter of the physical layer. In one embodiment of the invention, a modem selects between error-control negotiation sequences as a function of the type of modulation negotiated in the physical layer. In particular, the modem has at least two type of error-control negotiation sequences to select from: "LAPM or Disconnect," and "LAPM, MNP or Buffer." When the modem negotiates a V.32 or higher modulation, the modem uses the "LAPM or Disconnect" error control negotiation sequence. However, when the modem negotiates a V.22 bis or lower modulation, the modem uses the "LAPM, MNP or Buffer" error control sequence.

16 Claims, 1 Drawing Sheet

ERROR CONTROL NEGOTIATION BASED ON MODULATION

BACKGROUND OF THE INVENTION

The present invention relates to data communications equipment, e.g., modems, and, more particularly, to the error control negotiation phase of establishing a data connection.

In establishing a data connection between two modems, the modems perform a "handshaking" sequence to negotiate various parameters about the data connection, e.g., the type of modulation (which relates to line speed), and the type of error control protocol. The type of modulation is representative of the "physical" layer of a data connection, while the type of error control protocol is representative of the "link" layer of the data connection. The negotiation of the physical layer is always negotiated before the link layer.

The types of error control protocols used today are: "Link Access Protocol Modem" (LAPM), "Microcom Networking Protocol" (MNP), or "Buffer" (which in reality is no error control). Typically, in negotiating the type of error control protocol a modem tries each type of error control protocol in turn. In particular, the modem uses a negotiation sequence defined herein as "LAPM, MNP, or Buffer." In this negotiation sequence, the modem attempts to connect with the far-end modem for several seconds, e.g., 2 seconds, using an "LAPM" protocol like International Telecommunication Union (ITU) standard V.42. If the far-end modem does not appropriately respond, the modem then tries to connect with the far-end modem for several seconds, e.g., 6 seconds, using the "MNP" protocol. If this too is unsuccessful, the modem then falls back to a non-error control mode, i.e., the "Buffer" mode of operation. This type of negotiation sequence typically allows a modem to connect to the widest range of industry-available modems.

Unfortunately with higher modulation speeds available, like those in ITU standards V.34 and, to a lesser degree, V.32bis, the above error control negotiation sequence can present a problem. In particular, as noted above, the negotiation of the line speed (modulation) occurs before the negotiation of the type of error control. In order to determine the appropriate line speed, a modem uses a technique called "line probing." Unfortunately, the accuracy of current line probing techniques is not perfect. As a result, a modem may erroneously connect at too high a line speed. In other words, even though the line speed was successfully negotiated, the error rate at that line speed is high. This affects the time it takes to perform the subsequent error control negotiation. In particular, with an increase in the error rate, the LAPM type of error control may not be negotiated within the 2 seconds, mentioned above. Further, in severe cases, the time delay in negotiating the error control protocol will be so long that neither LAPM nor MNP is negotiated, causing the modem to fallback to buffer mode. The latter presents a problem, since users typically want V.42 error control and V.42bis data compression for their data calls, however in buffer mode neither V.42 error control nor V.42bis data compression are available.

One way to solve the above-mentioned problem is to have a different negotiation sequence for error control negotiation—"LAPM or Disconnect" for example. With this negotiation setting, the modem tries for an extended length of time, e.g., 30 seconds, to negotiate a LAPM data connection. Even if the modem has trouble at the start of the call, LAPM may still be negotiated because of the longer time delay. However, this negotiation sequence presents a problem when connecting to modems that do not support LAPM, i.e., MNP-only or non-error-control modems. In order to connect to MNP-only or non-error-control modems, the user must switch the modem back to using the "LAPM, MNP, or Buffer" error control negotiation sequence, described above. Typically, the user switches between error control negotiation sequences via an respective AT command. This is not user-friendly. In today's marketplace, the configuration of the modem itself, e.g., what type of error control negotiation sequence to use, should be transparent to the user.

SUMMARY OF THE INVENTION

However, I have realized a solution that solves all of the above problems and is user-friendly. I have observed that almost every high-speed modem (V.34, V.32bis, V.32) has a LAPM mode, and that the LAPM mode is enabled. Further, only the low-speed modems (V.22bis or below) are MNP-only or non-error control. And, finally, the modulation (physical layer) is always negotiated before the error control protocol (link layer). Therefore, and in accordance with the invention, a modem dynamically selects the type of link layer negotiation sequence as a function of a negotiated parameter of the physical layer.

In one embodiment of the invention, a modem selects between error control negotiation sequences as a function of the type of modulation negotiated in the physical layer. In particular, the modem has at least two type of error control negotiation sequences to select from: "LAPM or Disconnect," and "LAPM, MNP or Buffer." When the modem negotiates a V.32 or higher modulation, the modem uses the "LAPM or Disconnect" error control negotiation sequence. However, when the modem negotiates a V.22bis or lower modulation, the modem uses the "LAPM, MNP or Buffer" error control sequence.

In another embodiment of the invention, a modem uses the data rate negotiated at the physical layer, rather than the modulation, to select the type of error control sequence. For example, if the modem connects at 2400 bits per second (bps) or below, the modem uses the "LAPM, MNP or Buffer" error control sequence. However, if the modem connects at a rate higher than 2400 bps, the modem uses the "LAPM or Disconnect" error control negotiation sequence. It should be noted that even though V.34 supports 2400 bps, I have observed that this data rate is unlikely to be used, i.e., a data rate of 2400 bps or less can be used to infer there is no high-speed modem in the data connection.

The above-described inventive concept provides a number of advantages. The user does not have to administer the modem to select a particular type of error control negotiation sequence via an AT command or other type of strap setting. Further, a modem incorporating the inventive concept still maintains compatibility with a large part of the currently installed-base of modems. Finally, this approach allows a high-speed modem to connect at the highest feasible rate and still negotiate the use of the LAPM protocol.

DETAILED DESCRIPTION

Figure 1:
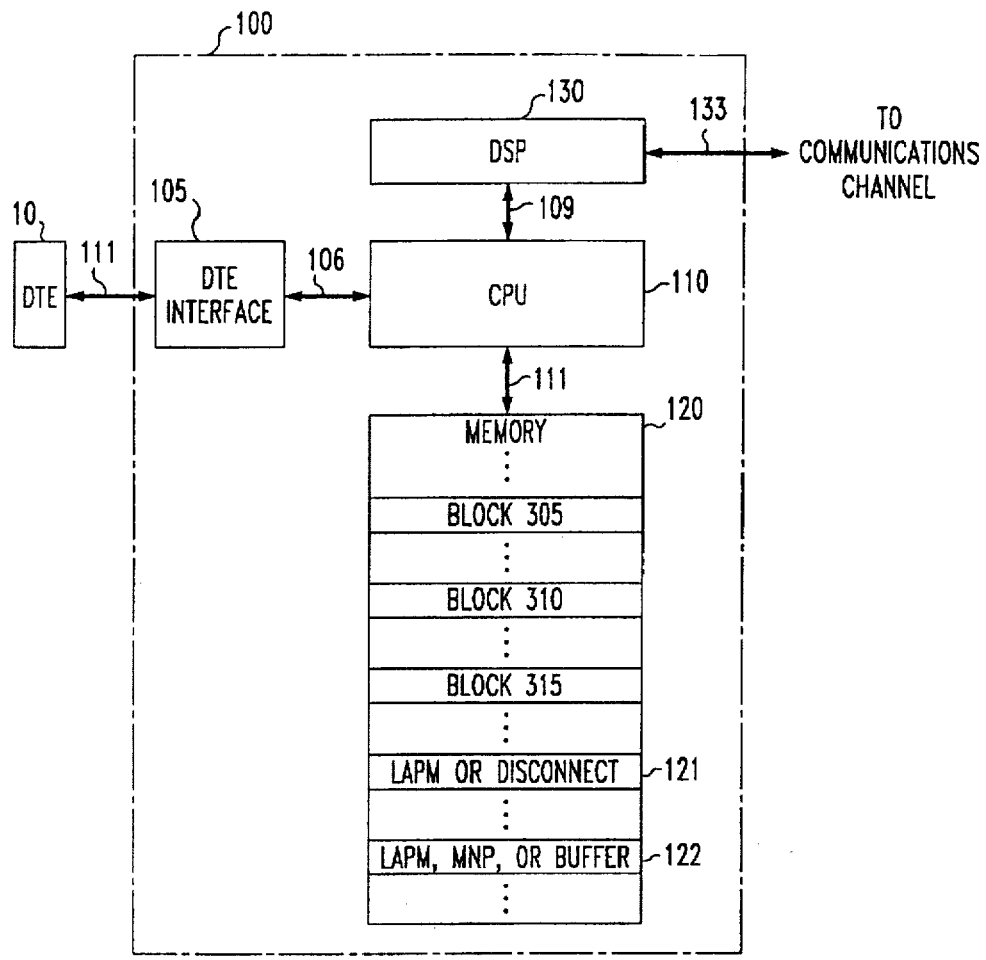
FIG. 1 is a block diagram of a data communications equipment embodying the principles of the invention.

FIG. 1 shows an illustrative high-level block diagram of a modem embodying the principles of the invention. As shown, modem 100 couples to a communications channel (not shown) via line 133, which is, e.g., a local loop that couples modem 100 to a local central office (not shown). Modem 100 is also coupled to respective data terminal equipment (DTE) 10 via line 11. Other than the inventive concept, the components of modem 100 are well-known and will not be described in detail. Modem 100 includes DTE interface 105, microprocessor-based central processing unit (CPU) 110, memory 120 and digital signal processing circuitry (DSP) 130. Since FIG. 1 is a high-level block diagram, other parts of modem 100 not important to the inventive concept are assumed to be included within these representative components. For example, DSP 130 is representative of not only a digital signal processing chip, but also includes the "data access arrangement" (DAA) circuitry that couples any transmitted and received data signals to, and from, line 133. Further, although shown as single lines in FIG. 1, lines 11, 106, 111,109, and 133, are representative of a plurality of signals as known in the art to interconnect the various components. For example, line 11 is representative of any one of a number of ways for coupling data communications equipment to data terminal equipment, e.g., a serial interface like that specified in Electronic Industry Association (EIA) standard RS-232.

As known in the art, CPU 110 provides a controlling function for modem 100, e.g., CPU 110 controls, via line 109, DSP 130 for establishing, maintaining, and disconnecting, from a data connection to a far-end modem (not shown), via line 109. In performing this controlling function, CPU 110 operates on, or executes, program data stored in memory 120 via line 111, which is representative of control, address, and data signals (not shown).

Figure 2:
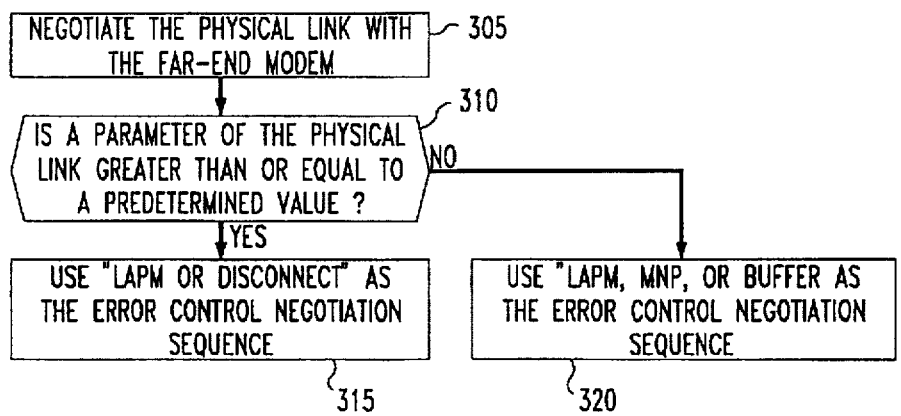
FIG. 2 is a flow diagram of an illustrative method embodying the principles of the invention for use in the modem of FIG. 1.

In accordance with the inventive concept, modem 100 dynamically selects the type of error control negotiation sequence as a function of the type of physical layer negotiated. Turning now to FIG. 2, an illustrative method embodying the principles of the invention will be described. The steps shown in FIG. 2 are illustratively stored in memory 120 as program data as represented by blocks 305, block 310, block 315, etc., of FIG. 1, respectively. For the purposes of this description, it is assumed that modem 100 has already initiated a data call to a far-end modem (not shown) and a handshaking sequence has begun. As known in the art, CPU 110 first negotiates with the far-end modem the physical layer of the data connection, as shown in step 305. (It should be realized that since this is a negotiation process, whether modem 100 is the originating, or answering, modem is irrelevant to the inventive concept). During the physical layer negotiation, modem 100 negotiates the type of modulation, e.g., V.22, V.22bis, V.32, V.32bis, and V.34 industry standards. After negotiation of the physical layer, CPU 110 evaluates a negotiated parameter of the physical layer in step 310. In particular, CPU 110 compares a value of the negotiated parameter to a predefined value. If the value of the negotiated parameter is greater than or equal to the predefined value, CPU 110 uses an "LAPM or Disconnect" error control negotiation sequence in step 315 as part of the link layer negotiation. The software instructions for executing the "LAPM or Disconnect" error control negotiation sequence are illustratively stored in memory 120 at location 121. With this negotiation setting, modem 100 tries for an extended length of time to negotiate a LAPM link layer on the data connection. If a LAPM link layer cannot be negotiated, modem 100 disconnects.

On the other hand, if the value of the negotiated parameter is less than the predefined value, CPU 110 uses an "LAPM, MNP or Buffer" error control negotiation sequence in step 320 as part of the link layer negotiation. The software instructions for executing the "LAPM, MNP, or Buffer" error control negotiation sequence are illustratively stored in memory 120 at location 122. As described earlier, in this negotiation sequence modem 100 attempts to connect with the far-end modem for several seconds using an "LAPM" protocol like International Telecommunication Union (ITU) standard V.42. If the far-end modem does not appropriately respond, modem 100 then tries to connect with the far-end modem for several seconds using the "MNP" protocol. If this too is unsuccessful, modem 100 then falls back to a non-error control mode, i.e., the "Buffer" mode of operation.

In one embodiment of the invention, the negotiated parameter from the physical layer is the type of modulation negotiated in the physical layer. In particular, when modem 100 negotiates a V.32 or higher modulation, modem 100 performs step 315, described above. However, when modem 100 negotiates a V.22bis or lower modulation, modem 100 performs step 320, described above.

In another embodiment of the invention, the negotiated parameter from the physical layer is the negotiated data rate. For example, if modem connects below 4800 bps, modem 100 performs step 320, described above. However, when modem 100 connects at a rate equal to or higher than 4800 bps, modem 100 performs step 315, described above. It should be noted that even though high-speed modulations, like V.34, support rates below 4800, I have observed that these data rates are unlikely to be used. As a result, a data rate less than 4800 bps can be used to infer there is no high-speed modem in the data connection.

The above-described inventive concept provides a number of advantages. The user does not have to administer the modem to select a particular type of error control negotiation sequence for use during the link layer negotiation. Further, a modem incorporating the inventive concept still maintains compatibility with a large part of the currently installed-base of modems. Finally, this approach allows a high-speed modem to connect at the highest feasible rate and still negotiate the use of the LAPM protocol.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g. a memory, CPU, etc., the functions of any one or more of those building blocks can be carded out using one or more appropriate integrated circuits, e.g., a microprocessor that includes memory.

In addition, although described in the context of a modem external to the data terminal equipment, the inventive concept applies to any other forms of coupling a modem to data terminal equipment, e.g., a modem that is internal to a personal computer or a modem that is part of a mobile phone transceiver. Finally, the selection of a link layer negotiation sequence can be a function of other data rates, types of modulations, and/or other parameters of the physical layer.

What is claimed:

1. A method for use in data communications equipment, the method comprising the steps of:

negotiating a physical layer of a data connection with a far-end data communications equipment to determine a set of parameters for the physical layer of the data connection with the far-end data communications equipment; and selecting one of a number of error control negotiation sequences as a function of a value of at least one parameter from the set of parameters for the physical layer.

2. The method of claim 1, further including the step of negotiating error control of the data connection with the far-end data communications equipment in accordance with the selected one of the number of error control negotiation sequences.

3. The method of claim 1, wherein the at least one parameter is the type of modulation negotiated with the far-end data communications equipment.

4. The method of claim 3, wherein the number of error control negotiation sequences include a Link Access Protocol Modem, Microcom Networking Protocol, or Buffer sequence and a Link Access Protocol Modem or Disconnect sequence.

5. The method of claim 4, wherein the Link Access Protocol Modem, Microcom Networking Protocol, or Buffer sequence is selected when the type of modulation negotiated is less than V.32, and wherein the Link Access Protocol Modem or Disconnect sequence is selected when the type of modulation negotiated is greater than or equal to V.32.

6. The method of claim 1, wherein the at least one parameter is the data rate negotiated with the far-end data communications equipment.

7. The method of claim 6, wherein the number of error control negotiation sequences include a Link Access Protocol Modem, Microcom Networking Protocol, or Buffer sequence and a Link Access Protocol Modem or Disconnect sequence.

8. The method of claim 7, wherein the Link Access Protocol Modem, Microcom Networking Protocol, or Buffer sequence is selected when the data rate is less than 4800 bits per second, and wherein the Link Access Protocol Modem or Disconnect sequence is selected the data rate is greater than or equal to 4800 bits per second.

9. Data communications apparatus comprising:

a memory that stores a number of error control negotiation sequences; and processor circuitry that negotiates a physical layer of a data connection with a far-end data communications equipment to determine a set of parameters for the physical layer of the data connection with the far-end data communications equipment, and then selects from memory one of a number of error control negotiation sequences as a function of a value of at least one parameter from the set of parameters for the physical layer.

10. The apparatus of claim 9, wherein the processor negotiates error control of the data connection with the far-end data communications equipment in accordance with the selected one of the number of error control negotiation sequences.

11. The apparatus of claim 9, wherein the at least one parameter is the type of modulation negotiated with the far-end data communications equipment.

12. The apparatus of claim 11, wherein the number of error control negotiation sequences include a Link Access Protocol Modem, Microcom Networking Protocol, or Buffer sequence and a Link Access Protocol Modem or Disconnect sequence.

13. The apparatus of claim 12, wherein the processor selects the Link Access Protocol Modem, Microcom Networking Protocol, or Buffer sequence when the type of modulation negotiated is less than V.32, and wherein the processor selects the Link Access Protocol Modem or Disconnect sequence when the type of modulation negotiated is greater than or equal to V.32.

14. The apparatus of claim 9, wherein the at least one parameter is data rate negotiated with the far-end data communications equipment.

15. The apparatus of claim 9, wherein the number of error control negotiation sequences include a Link Access Protocol Modem, Microcom Networking Protocol, or Buffer sequence and a Link Access Protocol Modem or Disconnect sequence.

16. The apparatus of claim 15, wherein the processor selects the Link Access Protocol Modem, Microcom Networking Protocol, or Buffer sequence when the data rate is less than 4800 bits per second, and wherein the processor selects the Link Access Protocol Modem or Disconnect sequence when the data rate is greater than or equal to 4800 bits per second.

* * * * *

UNITED STATES PATENT AND TRADEMARK OFFICE
CERTIFICATE OF CORRECTION

PATENT NO. : 5,710,761
DATED      : January 20, 1998
INVENTOR(S) : Scott

It is certified that error appears in the above-identified patent and that said Letters Patent is hereby corrected as shown below:

Title page of the patent, second column, six lines under the heading "ABSTRACT", change "type" to --types--.
Column 2, line 27, after "at least two" change "type" to --types--.
Column 4, line 22, change "4800" (in bold) to --4800-- (in regular font).
Column 4, line 49, after "can be" delete "carded" and insert therefor --carried--.

Signed and Sealed this

Twenty-sixth Day of May, 1998

Attest:

BRUCE LEHMAN

*Attesting Officer*   Commissioner of Patents and Trademarks